United States Patent
Cairo et al.

(10) Patent No.: US 9,453,421 B2
(45) Date of Patent: *Sep. 27, 2016

(54) APPARATUS HAVING ENGINEERED SURFACE FEATURE AND METHOD TO REDUCE WEAR AND FRICTION BETWEEN CMC-TO-METAL ATTACHMENT AND INTERFACE

(71) Applicant: GENERAL ELECTRIC COMPANY, Schenectady, NY (US)

(72) Inventors: Ronald Ralph Cairo, Simpsonville, SC (US); Jason Robert Parolini, Greer, SC (US); John McConnell Delvaux, Fountain Inn, SC (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/048,537

(22) Filed: Feb. 19, 2016

(65) Prior Publication Data

US 2016/0169007 A1 Jun. 16, 2016

Related U.S. Application Data

(63) Continuation of application No. 13/693,350, filed on Dec. 4, 2012, now Pat. No. 9,297,265.

(51) Int. Cl.
*F01D 5/30* (2006.01)
*F01D 5/14* (2006.01)
(Continued)

(52) U.S. Cl.
CPC ................ *F01D 5/282* (2013.01); *F01D 5/02* (2013.01); *F01D 5/3007* (2013.01); *F01D 5/3084* (2013.01); *F01D 5/3092* (2013.01);
(Continued)

(58) Field of Classification Search
CPC ...... F01D 5/3084; F01D 5/282; F01D 5/284; F01D 5/3092; F01D 5/147; F01D 5/3007; F05D 2300/6033; Y02T 50/672
USPC ........ 416/219 R, 220 R, 221, 230, 239, 248, 416/241 B; 29/889.21, 889.71
See application file for complete search history.

(56) References Cited

U.S. PATENT DOCUMENTS

| 5,405,660 A | 4/1995 | Psiuk et al. |
| 5,466,979 A | 11/1995 | Bryant et al. |

(Continued)

FOREIGN PATENT DOCUMENTS

| DE | 379345 C | 6/1953 |
| EP | 0331516 A1 | 9/1989 |

(Continued)

OTHER PUBLICATIONS

Official English Translation of DE 879,345, May 2016.*

*Primary Examiner* — Christopher Verdier
(74) *Attorney, Agent, or Firm* — McNees Wallace & Nurick LLC

(57) ABSTRACT

An apparatus having reduced wear and friction between CMC-to-metal attachment and interface of the apparatus, including a CMC component having a surface. The CMC component surface is configured for sliding contact with a surface of a metal component, the sliding contact resulting in formation of debris along the contacting surfaces. The surface of the CMC component has an engineered surface feature formed therein to substantially prevent an accumulation of debris along the contacting surfaces.

19 Claims, 3 Drawing Sheets

(51) Int. Cl.
    *F01D 5/28*     (2006.01)
    *F01D 5/02*     (2006.01)

(52) U.S. Cl.
    CPC .............. *F01D 5/147* (2013.01); *F01D 5/284* (2013.01); *F05D 2220/32* (2013.01); *F05D 2240/24* (2013.01); *F05D 2250/711* (2013.01); *F05D 2250/712* (2013.01); *F05D 2300/6033* (2013.01); *Y02T 50/672* (2013.01)

(56) References Cited

U.S. PATENT DOCUMENTS

| | | |
|---|---|---|
| 6,129,967 A | 10/2000 | Young et al. |
| 9,297,265 B2 * | 3/2016 | Cairo ................... F01D 5/3092 |
| 2005/0069411 A1 | 3/2005 | Bast et al. |
| 2005/0254953 A1 | 11/2005 | Stone |
| 2010/0063589 A1 | 3/2010 | Tepic |
| 2010/0284816 A1 | 11/2010 | Propheter-Hinckley et al. |
| 2013/0084188 A1 | 4/2013 | Nagano et al. |
| 2014/0056714 A1 | 2/2014 | Gopalakrishnan et al. |

FOREIGN PATENT DOCUMENTS

| | | |
|---|---|---|
| EP | 0352476 A2 | 1/1990 |
| EP | 0930948 B1 | 8/2000 |
| EP | 1676823 B1 | 8/2008 |
| WO | 98/31467 A1 | 7/1998 |

\* cited by examiner

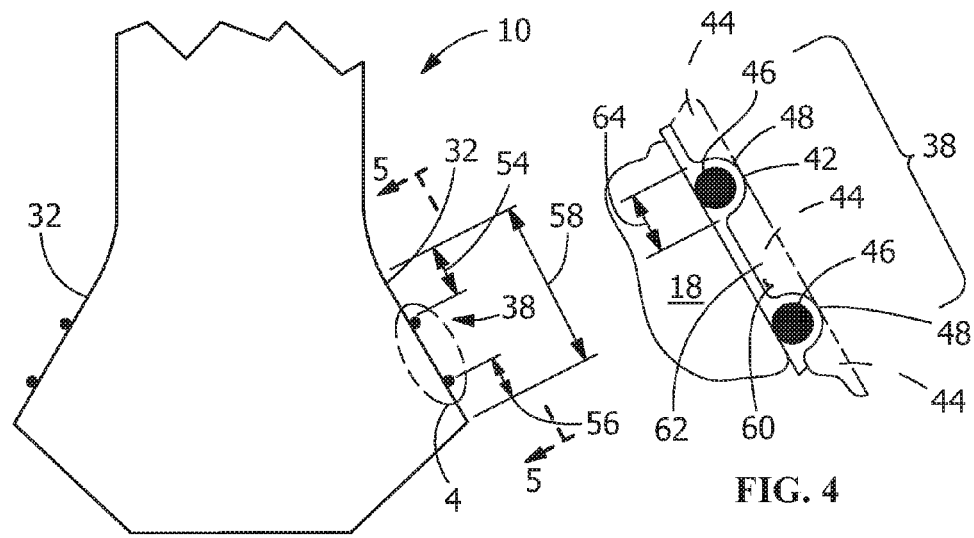
FIG. 3
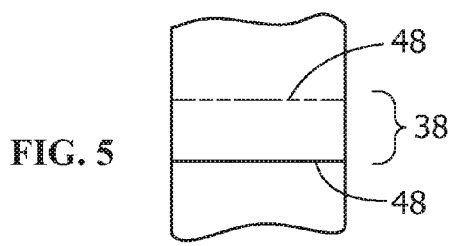
FIG. 4
FIG. 5
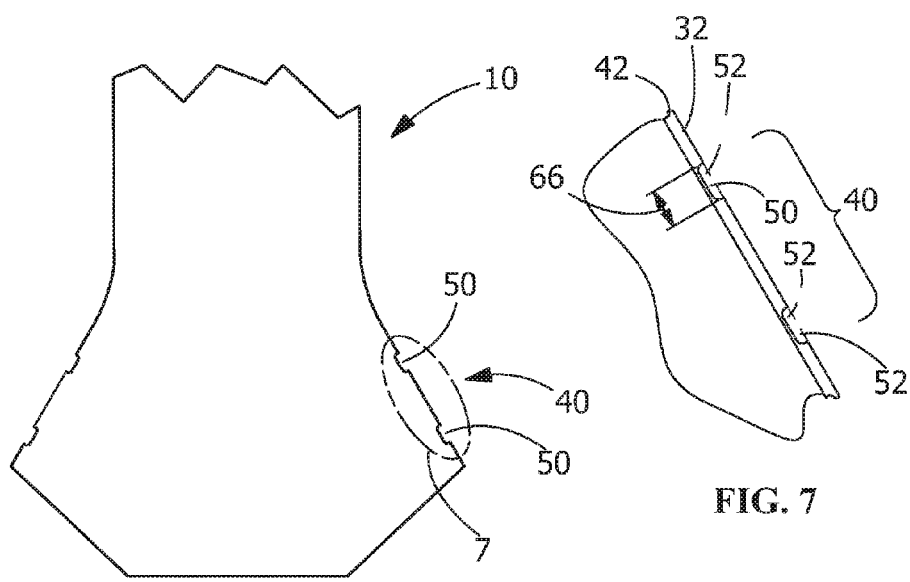
FIG. 6
FIG. 7

APPARATUS HAVING ENGINEERED SURFACE FEATURE AND METHOD TO REDUCE WEAR AND FRICTION BETWEEN CMC-TO-METAL ATTACHMENT AND INTERFACE

CROSS-REFERENCE TO RELATED APPLICATIONS

This application is a continuation of U.S. patent application Ser. No. 13/693,350, now U.S. Pat. No. 9,297,265.

STATEMENT REGARDING FEDERALLY SPONSORED RESEARCH OR DEVELOPMENT

This invention was made with government support under Contract No. DE-FC26-05NT42643. The United States government may have certain rights to the invention.

FIELD OF THE INVENTION

The present invention relates generally to ceramic matrix composite (CMC) components attaching and interfacing with metal components, and more particularly, to ceramic matrix composite turbine engine components attaching and interfacing with metal components in a manner to reduce wear and friction between the components during operation.

BACKGROUND OF THE INVENTION

Ceramic matrix composites (CMC) are often used in applications requiring high strength in elevated temperature environments, such as turbine engine components, including turbine blades.

Generally, such turbine components require attachment to adjoining metallic hardware and/or metallic surfaces, sometimes referred to as disks. Among disadvantages associated with attaching a CMC to metallic hardware is the wear of the metallic hardware by the hard, abrasive ceramic material surface. Debris generated as a result of wear, when trapped between CMC and metallic hardware surfaces, acts to accelerate the wear between the CMC and metallic components. Under high contact stresses, damage to the ceramic material surface is also possible, usually due to matrix cracking and fiber breakage that lead to the formation of wear troughs.

In response, U.S. Publication No. U.S. 2010/0284816 discloses a method for creating a fir tree dovetail attachment for a CMC airfoil using a secondary metallic member with multiple contact surfaces. The metallic member is intended to trap the CMC and transfer the airfoil loading into the metallic member which has features/bearing surfaces similar to a multi-tooth fir tree attachment. These surfaces are designed for load transfer and not to reduce friction or wear at the disk attachment interface. Design against wear is not discussed.

U.S. Pat. No. 5,466,979 discloses use of a vibration source with a tailored frequency to help remove debris particles that build-up on the contact surface in an effort to lessen wear rates.

EP Publication No. 0 352 476 discloses incorporating a circumferential internal wear pocket and radial slots, but for purposes of reducing forced excitation due to fluid flow.

What is needed is an apparatus or method of manufacturing CMC turbine engine components that provides engineered surface features for reducing wear between CMC-to-metal surfaces by substantially removing or otherwise substantially preventing debris from remaining in contact between interfacing CMC-to-metal surfaces.

SUMMARY OF THE INVENTION

Improvements in manufacturing technology and materials are the keys to increased performance and reduced costs for many articles. As an example, continuing and often interrelated improvements in processes and materials have resulted in major increases in the performance of aircraft gas turbine engines, such as the improvements of the present invention. In one embodiment, the present invention is directed to an apparatus and method for providing engineered surface features in components made from a ceramic matrix composite (CMC) in which CMC-to-metal attachment and interface occurs. The engineered surfaces substantially remove or otherwise substantially prevent debris from remaining in contact between interfacing CMC-to-metal surfaces.

One embodiment is directed to a rotor blade for a gas turbine engine includes an airfoil extending between a root having a pair of opposed surfaces and a tip opposite the root. A rotor disk includes a slot configured to receive the root, the rotor disk having a pair of opposed surfaces configured to form a sliding contact with the pair of root surfaces, the sliding contact resulting in formation of debris along the sliding contact surfaces. The root includes engineered surface features formed therein to substantially prevent an accumulation of debris along the surfaces of sliding contact.

Another embodiment is directed to a method to reduce wear and friction between ceramic matrix composite (CMC)-to-metal attachment and interface of an apparatus, including providing a CMC component having a surface and providing a metal component having a surface. The method further includes arranging the surface of the CMC component in sliding contact with the surface of the metal component, the sliding contact resulting in formation of debris along the sliding contact surfaces. The method further includes substantially preventing an accumulation of debris along the sliding contact surfaces of the CMC component relative to the contacting surface of the metal component during operation of the apparatus.

Another embodiment is directed to an apparatus having reduced wear and friction between a CMC-to-metal attachment and interface of the apparatus, including a CMC component having a surface. The CMC component surface is configured for sliding contact with a surface of a metal component, the sliding contact resulting in formation of debris along the contacting surfaces. The surface of the CMC component has an engineered surface feature formed therein to substantially prevent an accumulation of debris along the contacting surfaces.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 3 is an exemplary partial side view of a composite blade of the present invention.

FIG. 4 is an exemplary enlarged partial side view of the composite blade taken from region 4 of FIG. 3 of the present invention.

FIG. 5 is a view taken along line 5-5 of FIG. 3 of the present invention.

FIG. 6 is an exemplary partial side view of a composite blade of the present invention.

FIG. 7 is an exemplary enlarged partial side view of the composite blade taken from region 7 of FIG. 6 of the present invention.

DETAILED DESCRIPTION OF THE INVENTION

Figure 1:
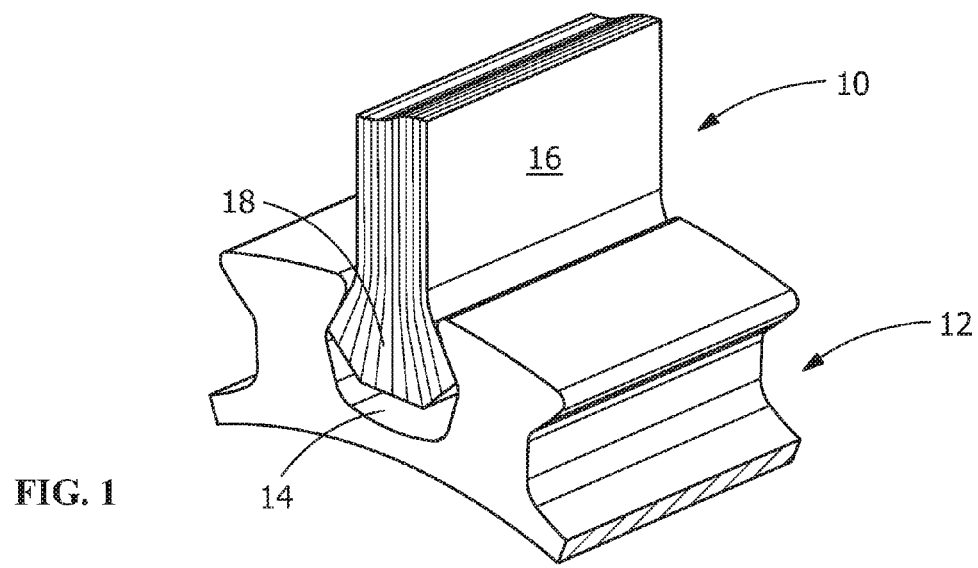
FIG. 1 is an exemplary partial sectional perspective view of a composite blade of the present invention assembled in a dovetail slot of a gas turbine engine rotor disk.

FIG. 1 depicts an exemplary gas turbine engine blade 10. In this illustration, a turbine blade 10 is constructed of a ceramic matrix composite material. Turbine blade 10 is mounted to a turbine disk 12 in a dovetail slot 14. Turbine blade 10 includes an airfoil 16, against which a flow of hot exhaust gas is directed, and a dovetail 18, also referred as a root or splayed base, that extends from airfoil 16 and engages dovetail slot 14.

Figure 2:
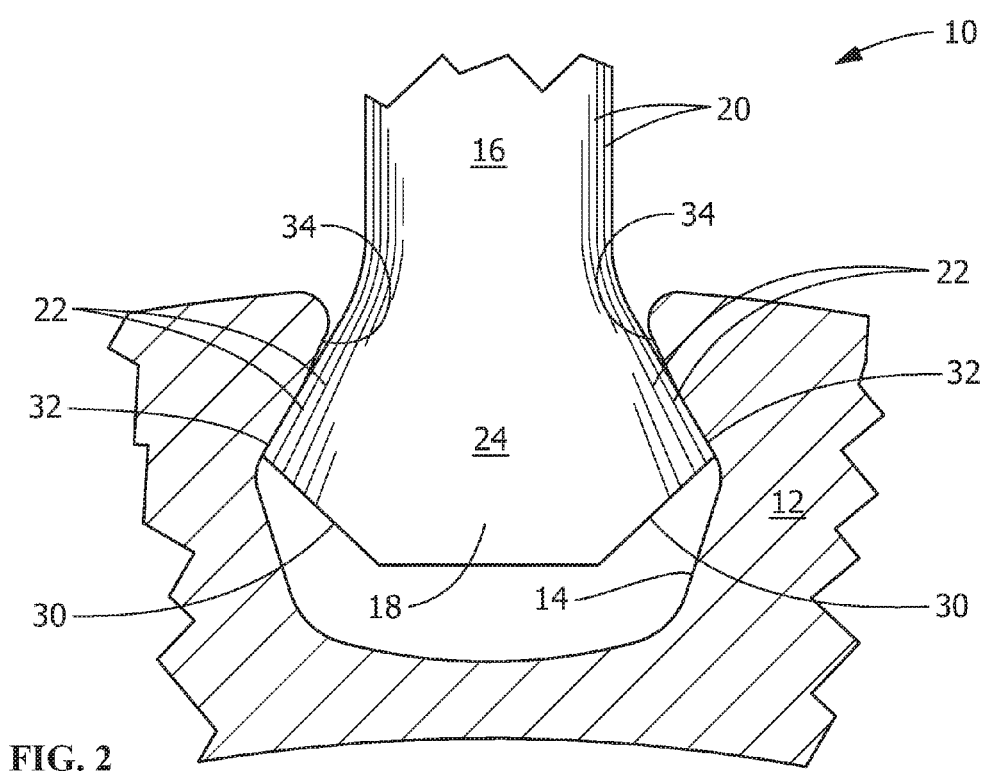
FIG. 2 is a partial sectional view of the blade and disk of FIG. 1 of the present invention.

Referring now to FIG. 2, which is an example of an enlarged sectional view of a CMC blade 10 and disk 12, the contacting surfaces thereon are described in greater detail. The blade 10 includes a plurality of plies, 20 and 22, which have been bonded together, such as by processes well known in the art. Plies 22 are bonded to a root core 24. The lower end of blade 10 is defined in part by an end surface 30 and a root surface 32. Dovetail slot 14 of disk 12 is defined by a mating surface 34. A collective pair of interface surfaces are formed between opposed corresponding root surfaces 32 and mating surfaces 34. Wear between root surfaces 32 of CMC blade 10 and mating surfaces 34 of disk 12 occurs as a result of abrasive contact due to asperities inherent in processing CMC blade 10, in combination with radially directed sliding contact, including cyclic sliding contact between root surfaces 32 of CMC blade 10 and mating surfaces 34 of disk 12, due to centrifugal forces and airfoil vibration generated during the high-speed rotational movement of the gas turbine engine. For purposes herein, the terms sliding contact, sliding interface, attachment and interface and the like are intended to be used interchangeably.

FIGS. 3-5 collectively show an exemplary embodiment of a CMC blade 10 having engineered surface features 38 for reducing wear of a disk 12 (FIG. 1). CMC blade 10 includes engineered surface features formed in opposed surfaces 32 that contact disk 12. As shown more closely in FIG. 4, engineered surface feature 38 includes spaced protrusions 48 extending axially along surfaces 32. Protrusions 48 are composed of tows 46 that are bundles of filaments of CMC, which provide a basis for structural strength for engineered surface features 38. Engineered surface features 38 may be formed by removing a portion of an outer layer of a matrix material 42 by machining. Alternately, engineered surface features 38 may be formed by the use of contoured tooling associated with the manufacture of the blade or other CMC component to form the desired profile of the outer layer of a matrix material 42. As further shown in the FIG. 4, the profile of engineered surface feature 38 is defined by the amount of removed matrix material 44 from the original layer of matrix material 42 forming the exterior surface of blade 10. Removal of the matrix material 42 can be achieved by a contoured grinder or other device. In one embodiment, protrusion 48 can extend outwardly, i.e., "height", relative to the surface defined by removed matrix material 44 of between about 0.05 mm and about 0.10 mm, between about 0.05 mm and about 0.08 mm, between about 0.08 mm and about 0.10 mm, or any suitable range or sub-range thereof. In one embodiment, engineered surface feature 38 height is about 0.05 mm, about 0.08 mm, about 0.10 mm, or any suitable sub-range thereof. In one embodiment, radially spaced opposed sides of each protrusion 48 can have a width 64 (FIG. 4) due to the profile defined by removed matrix material 44 of between about 0.05 mm and about 0.10 mm, between about 0.05 mm and about 0.08 mm, between about 0.08 mm and about 0.10 mm, or any suitable range or sub-range thereof. In one embodiment, each protruding engineered surface feature 38 width is about 0.05 mm, about 0.08 mm, about 0.10 mm, or any suitable sub-range thereof.

Incorporation of such integral geometric features, during processing of the CMC helps avoid deleterious machining of load carrying fibers or tows, avoid introducing stress concentrations by machining and notably, avoiding interlaminar damage during the machining operation which can be subsequently propagated by vibration causing loss of stiffness and possible blade liberation.

Although FIG. 3 shows a pair of opposed protruding engineered surface features 38, another embodiment may have more than two opposed protruding engineered surface features 38.

While engineered surface feature 38 provides a reduced amount of contact surface area with disk 12, debris 60 (FIG. 4) removed from disk 12 by virtue of sliding contact with dovetail or root 18 of blade 10 can accumulate in gap 62, resulting from the offset between the contoured profile of protrusion 48 of blade 10 and mating surface 34 of disk 12 (FIG. 2). By accumulating debris in gap 62, i.e., not along the interfacing surfaces between disk 12 and blade 10, wear between the interfacing surfaces is reduced, thereby prolonging the time between maintenance, and increasing the service life of disk 12 and blade 10. Alternately, and/or in addition to accumulating debris 60 in gap 62, if the engineered features extend axially along the entire width of blade 10, or at least to one edge of the blade, the debris may exit gap 62 during operation (e.g., by vibration, etc.) or during a service interval (e.g., by compressed air, cleaning solution, etc.) without the requirement for removing the blades from the disk dovetail.

In other words, by virtue of the engineered surface features 38, in which debris 60 accumulates in gap 62 and/or exits gap 62 during operation, debris 60 generated between interfacing surfaces of disk 12 and blade 10 is removed. Therefore, the engineered surface features 38 substantially prevent an accumulation of debris 60 along the surfaces of interfacing or sliding contact surfaces of disk 12 and blade 10.

As further shown in FIG. 3, axially arranged engineered surface features 38 (engineered surface features 40 not shown in FIG. 3) should maintain distances or spacings 54, 56 from opposed ends of root surface 32 of blade 10, which is shown having a contact length indicated by element 58. That is, contact length 58 of root surface 32 of blade 10 represents the substantially planar distance spanned by root surface 32, i.e., the distance between the end of root surface 32 and the point of tangency with the radius associated with transitioning the blade from root 18 to airfoil 16. Spacing 56 extends from the end of root surface 32 and protrusion 48 of engineered surface features 38, and generally represents about one fourth of contact length 58 of root surface 32. In one embodiment, spacing 56 represents a minimum of one fourth of contact length 58 of root surface 32. Similarly, spacing 54, which extends from the point of tangency with the radius associated with transitioning the blade from root 18 to airfoil 16, and protrusion 48 of engineered surface features 38, generally represents about one fourth of contact length 58 of root surface 32. In other words, engineered surface features 38, 40 are generally spaced about one fourth of contact length 58 of root surface 32 from either end of the root surface 32. In one embodiment, spacing 54 represents a minimum of one fourth of contact length 58 of root surface 32 from either end of the root surface 32. In one embodiment, the spacing, number and length of engineered surface features 38 may be related to wear distribution or wear rate along root surface 32. As shown in FIG. 5, protruding engineered surface features 38 can extend continuously in an axial direction along root surface 32 and/or extend discontinuously in an axial direction along root surface 32.

FIGS. 6-7 collectively show an exemplary embodiment of a CMC blade 10 having engineered surface features 40 for reducing wear of a disk 12 (FIG. 1). As shown more closely in FIG. 6, engineered surface feature 40 includes spaced recesses 50 extending axially along surfaces 32. Recessed engineered surface features 40 are formed by removing, whether by machining, or by use of tooling associated with the manufacture of the blade, of a portion of an outer layer of a matrix material 42. Similar to as shown in FIG. 4, the profile of recesses 50 of engineered surface feature 40 is also defined by the amount of removed matrix material 52 from the original layer of matrix material 42 forming the exterior surface of blade 10. Removal of the matrix material 42 can be achieved by a contoured grinder or other device. In one embodiment, recess 50 can extend inwardly, i.e., "depth" defined by removed matrix material 52 relative to the pristine root surface 32 between about 0.05 mm and about 0.13 mm, between about 0.05 mm and about 0.10 mm, between about 0.08 mm and about 0.13 mm, between about 0.08 mm and about 0.10 mm, or any suitable range or sub-range thereof. In one embodiment, each recessed engineered surface feature 40 width is about 0.05 mm, about 0.08 mm, about 0.10 mm, about 0.13 mm, or any suitable sub-range thereof. In one embodiment, radially spaced opposed sides of recesses 50 can have a width 66 (FIG. 7) due to the profile defined by removed matrix material 44 of between about 0.05 mm and about 0.10 mm, between about 0.05 mm and about 0.08 mm, between about 0.08 mm and about 0.10 mm, or any suitable range or sub-range thereof. In one embodiment, width 66 of engineered surface feature 40 is about 0.05 mm, about 0.08 mm, about 0.10 mm, or any suitable sub-range thereof.

Recesses 50 of engineered surface features 40 are substantially U-shaped in one embodiment, although in other embodiments, the profile may be different, such as any suitable curve, such as elliptical that are sized to minimize stress concentrations, reduce wear or improve debris removal from the interface.

Although FIG. 3 shows a pair of opposed recessed engineered surfaces 40, another embodiment may have more than two opposed recessed engineered surfaces 40.

Figure 8:
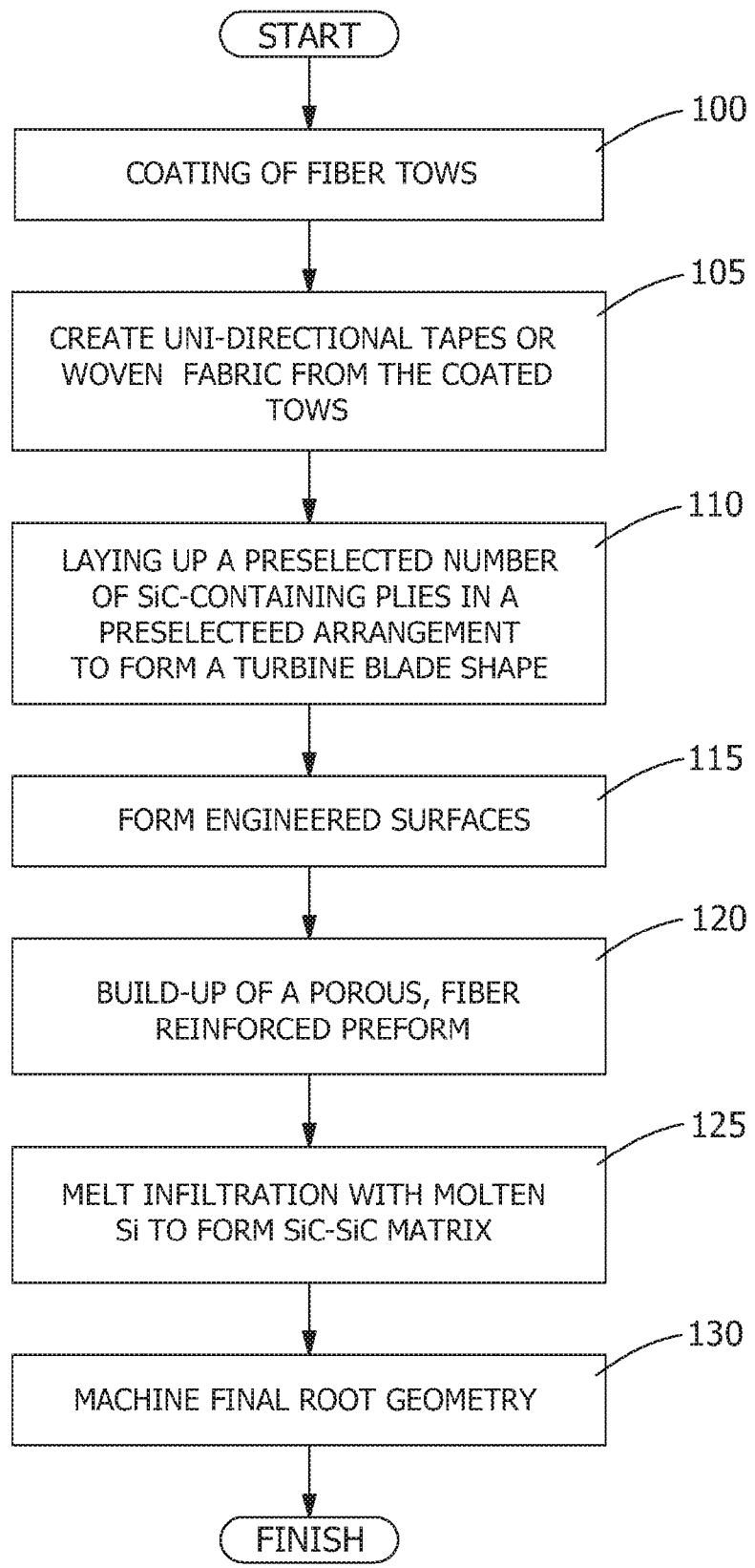
FIG. 8 is a flow chart illustrating a method of manufacture of the present invention to produce a CMC turbine blade with engineered surfaces.

FIG. 8 is a flow chart illustrates a method of manufacture of the present invention to produce a component for use in a heated environment, such as a CMC turbine blade, although other methods, may be used. Heated environment, as used herein refers to temperatures in excess of at least about 538° C. The initial step 100 of the process typically includes coating fiber tows for protection and interfacial properties. Once fiber tows are coated, the next step 105 includes creating tapes, such as uni-directional tapes or woven fabric from the coated tows. Once the tapes or woven fabric from the coated tows have been created, the next step 110 includes laying up a preselected number of plies, such as with SiC-containing tape pieces of preselected geometry in a preselected arrangement to form a turbine blade shape.

In one embodiment, laying up the SiC cloth includes arranging fiber tows 46, which tows compose and form the structural basis for protruding engineered surface features 38 (FIGS. 3-4). Fiber tows 46 are the basic building elements of continuous fiber reinforced SiC CMCs. As shown in FIG. 5, fiber tows 46 can continuously extend axially along the entire width of the preform, or can extend discontinuously along a portion of the width of the preform.

Once the plies are laid up, the next step 115 includes forming an engineered surface, i.e., for protruding surfaces, by strategic insertion of axial tows as shown in FIGS. 3 and 4.

The next step 120 includes building-of a porous, fiber reinforced preform with preliminary C and/or SiC by chemical reaction or by bonding of SiC particulates with the infiltrated molten Si.

The next step 125 includes melt infiltrating with molten Si to form SiC-CiC matrix as is known in the art.

The next step 130 includes machining final root geometry, including surface features not integrated into step 115, such as for recessed surface features 40 (FIG. 7) or further forming protruding surface features 38 (FIG. 4). Such machining may include utilizing contoured grinding wheels or machining operations known in the art. Alternately, use of similarly contoured tooling along surface 32 (FIG. 2) of the turbine blade may be sufficient to form the engineered surface features, or at least minimize an amount of subsequent machining required to form the desired engineered surface features as previously discussed.

It is to be understood that the engineered surface features 38, 40 as described herein, may also be applied to attachment locations for ceramic composites such as shrouds or combustion liners, or any other appropriate location that would benefit from an engineered surface with the benefits described herein. Additionally, the engineered surface features can, in addition to contact surfaces between different components, also include lining apertures used for structural fasteners.

It is to be understood that the engineered surface features of the present invention includes other constructions or arrangements, such as a root or dovetail having a "fir tree" arrangement, or multiple interfacing surfaces between the root or dovetail surfaces and the disk slot surfaces, as is well known.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:
1. A rotor blade for a gas turbine engine comprising:
an airfoil extending between a root having a pair of opposed surfaces and a tip opposite the root; and a rotor disk including a slot configured to receive the root, the rotor disk having a pair of opposed surfaces configured to form a sliding contact with the pair of root surfaces, the sliding contact resulting in formation of debris along the sliding contact surfaces;

the root including engineered surface features formed therein and continuously extending in an axial direction along the entire axial extent of the root surfaces to substantially prevent an accumulation of debris along the surfaces of sliding contact.

2. A method to reduce wear and friction between a ceramic matrix composite (CMC)-to-metal attachment and interface of an apparatus, comprising:

providing a CMC component having a surface including engineered surface features formed therein and continuously extending in an axial direction along the entire axial extent of the surface;

providing a metal component having a surface;

arranging the surface of the CMC component in sliding contact with the surface of the metal component, the sliding contact resulting in formation of debris along the sliding contact surfaces; and substantially preventing an accumulation of debris along the sliding contact surfaces of the CMC component relative to the contacting surface of the metal component during operation of the apparatus.

3. The method of claim 2, wherein substantially preventing an accumulation of debris along the sliding contact surfaces includes forming an engineered surface feature in the surface of the CMC component arranged in sliding contact with the surface of a metal component.

4. The method of claim 3, wherein forming an engineered surface feature includes removing a portion of an outer layer of matrix material of the CMC component by machining.

5. The method of claim 3, wherein forming an engineered surface feature includes use of contoured tooling associated with the manufacture of the CMC component.

6. An apparatus having reduced wear and friction between a CMC-to-metal attachment and interface of the apparatus, comprising:

a CMC component having a surface;

the CMC component surface being configured for sliding contact with a surface of a metal component, the sliding contact resulting in formation of debris along the contacting surfaces;

the surface of the CMC component having an engineered surface feature formed therein and continuously extending in an axial direction along the entire axial extent of the surface to substantially prevent an accumulation of debris along the contacting surfaces.

7. The apparatus of claim 6, wherein the engineered surface feature is a protrusion.

8. The apparatus of claim 7, wherein the protrusion is composed of fiber tows.

9. The apparatus of claim 8, wherein a height of the protrusion is between about 0.05 mm to about 0.10 mm.

10. The apparatus of claim 8, wherein a height of the protrusion is about 0.08 mm.

11. The apparatus of claim 8, wherein a width of the protrusion is between about 0. 05 mm to about 0.10 mm.

12. The apparatus of claim 8, wherein a width of the protrusion is about 0.08 mm.

13. The apparatus of claim 6, wherein the engineered surface feature is generally spaced about one fourth of a contact length from an end of the surface.

14. The apparatus of claim 6, wherein the engineered surface feature is a recess.

15. The apparatus of claim 14, wherein a depth of the recess is between about 0.05 mm to about 0.13 mm.

16. The apparatus of claim 14, wherein a depth of the recess is about 0.08 mm.

17. The apparatus of claim 14, wherein a width of the recess is between about 0.05 mm to about 0.10 mm.

18. The apparatus of claim 14, wherein a profile of the recess is curved.

19. The apparatus of claim 14, wherein a profile of the recess is substantially U-shaped.

* * * * *